United States Patent
Cvijanovic

(10) Patent No.: US 12,238,258 B2
(45) Date of Patent: Feb. 25, 2025

(54) REMOTE ATTENDANCE AND PARTICIPATION SYSTEMS AND METHODS

(71) Applicant: Pfetch, Inc., Miami, FL (US)

(72) Inventor: Christi L. Cvijanovic, Miami Beach, FL (US)

(73) Assignee: Pfetch Inc., Miami, FL (US)

(*) Notice: Subject to any disclaimer, the term of this patent is extended or adjusted under 35 U.S.C. 154(b) by 0 days.

(21) Appl. No.: 18/011,929

(22) PCT Filed: Jul. 2, 2021

(86) PCT No.: PCT/US2021/040263
§ 371 (c)(1),
(2) Date: Dec. 21, 2022

(87) PCT Pub. No.: WO2022/006504
PCT Pub. Date: Jan. 6, 2022

(65) Prior Publication Data
US 2023/0239446 A1    Jul. 27, 2023

Related U.S. Application Data

(60) Provisional application No. 63/047,934, filed on Jul. 3, 2020.

(51) Int. Cl.
*H04N 13/117* (2018.01)
*H04N 13/15* (2018.01)
(Continued)

(52) U.S. Cl.
CPC ........... *H04N 13/117* (2018.05); *H04N 13/15* (2018.05); *H04N 13/194* (2018.05); *H04N 13/204* (2018.05)

(58) Field of Classification Search
CPC .... H04N 13/117; H04N 13/15; H04N 13/194; H04N 13/204; H04N 13/243; G06F 3/016; G06F 3/011
(Continued)

(56) References Cited

U.S. PATENT DOCUMENTS

2017/0076429 A1* 3/2017 Russell .................. G06T 15/04
2019/0045171 A1* 2/2019 Volochniuk ............ G06T 19/00
(Continued)

FOREIGN PATENT DOCUMENTS

| EP | 3404916 A1 | 11/2018 |
|---|---|---|
| WO | 2018117587 A1 | 6/2018 |
| WO | 2021067143 A3 | 4/2021 |

OTHER PUBLICATIONS

International Search Report and Written Opinion for PCT/US2021/040263; mailed Oct. 21, 2021; pp. 1-10.
(Continued)

*Primary Examiner* — Tung T Vo
(74) *Attorney, Agent, or Firm* — Mei & Mark LLP

(57) ABSTRACT

A method of transferring data can comprise dividing an experience space into polyhedrons comprising a network of interconnected planes. Sheets of experience space data of the experience space can be collected via a distributed sensor array. Each sensor of the distributed sensor array can comprise a corresponding sheet of experience space data. One of the polyhedrons can be selected as a client location polyhedron. Client location data can be extracted from the experience space data. The client location data can correspond to the client location polyhedron. Extraction can be by intersecting ones of the sheets of experience space data to form a polyhedral data set.

21 Claims, 11 Drawing Sheets

(51) Int. Cl.
*H04N 13/194* (2018.01)
*H04N 13/204* (2018.01)

(58) Field of Classification Search
USPC .......................................... 348/47
See application file for complete search history.

(56) References Cited

U.S. PATENT DOCUMENTS

| | | | |
|---|---|---|---|
| 2019/0099678 A1* | 4/2019 | Khan | A63F 13/44 |
| 2020/0171394 A1 | 6/2020 | Khan et al. | |
| 2020/0329224 A1* | 10/2020 | Volochniuk | G06F 3/011 |
| 2022/0353334 A1* | 11/2022 | Cvijanovic | G06Q 30/0203 |

OTHER PUBLICATIONS

Uppal, Rajesh, "Optical Processors for high performance and energy efficient computing for data centres and supercomputers"; dated Feb. 26, 2021; pp. 1-9. https://idstch.com/technology/ict/future-all-optical-processors-enable-high-performance-and-energy-efficient-computing-architectures-from-network-infrastructure-from-data-centres-and-supercomputers-to-neuromorphic-chips/ downloaded Jun. 15, 2021.

Tselnik, F. "Platonic solids symmetry in particle physics"; Communications in Nonlinear Science and Numerical Simulation, vol. 12 (2007) p. 1427-1439, available online May 19, 2006. https://www.researchgate.net/publication/222618439_Platonic_solids_symmetry_in_particle physics downloaded Jun. 27, 2021.

* cited by examiner

REMOTE ATTENDANCE AND PARTICIPATION SYSTEMS AND METHODS

This is a § 371 National Stage Entry of Patent Cooperation Treaty Application No. PCT/US2021/040263, filed Jul. 2, 2021 and claims the benefit of U.S. provisional application No. 63/047,934 filed Jul. 3, 2020, all of which are incorporated herein by reference.

FIELD

A method and system for enabling remote attendance and participation comprises a transfer of one or both of experience space data and client space data. Polyhedral data sets can be collected, transferred, extracted, and inserted to enable a remote client to attend an experience space and to enable the remote client to participate in the experience space.

BACKGROUND

A news broadcast told of a Korean sports event. The attempt to fill an empty stadium at a baseball game, not allowed to be filled with fans due to Covid-19, was via silent visual posters, but no sound. More recently, screens have been installed to display images of fans. But, these fans do not experience the game as if they were sitting in the stadium, nor do the players experience the game as if active participants are present.

SUMMARY

The methods and devices disclosed herein overcome the above disadvantages and improves the art by way of at least a remote attendance system and method, a system and method for providing audio input to an experience space, such as an architectural space or natural setting, and a system and method for displaying client participation. Such can comprise computer readable mediums and machine-readable medium carrying machine readable instructions.

A system and method for interacting with a designated space can comprise a first transceiver comprising a first broadcast device for collecting first footage comprising audio and video footage of the designated space and for broadcasting the collected footage to a second transceiver. A first output device can be included for receiving and emitting received audio or video feedback from the second transceiver. The second transceiver can comprise a second broadcast device configured for collecting second footage comprising one or both of audio and video footage of a client or client space and for broadcasting the collected footage to the first output device.

A method of transferring data can comprise dividing, collecting and extracting to form a polyhedral data set. Organizing data in this way improves the realism of user experiences based on the data and improves the scalable insertion, interpolation, and extraction of data sets.

A method of transferring data can comprise dividing an experience space into polyhedrons comprising a network of interconnected planes. Sheets of experience space data of the experience space can be collected via a distributed sensor array. Each sensor of the distributed sensor array can comprise a corresponding sheet of experience space data. One of the polyhedrons can be selected as a client location polyhedron. Client location data can be extracted from the experience space data. The client location data can correspond to the client location polyhedron. Extraction can be by intersecting ones of the sheets of experience space data to form a polyhedral data set.

Optionally, the polyhedrons comprise a combination of icosahedrons and tetrahedrons.

Optionally, sensors of the distributed sensor array comprise sheets of material for collecting two-dimensional data, and the method comprises extracting, from the two-dimensional data, a three-dimensional polyhedron forming the polyhedral data set.

Optionally, extracting three-dimensional polyhedrons comprises assigning one or both of actual nodes and virtual nodes to form the vertices of the three-dimensional polyhedron. Actual nodes or the virtual nodes can be read from the two-dimensional data or interpolated from the two-dimensional data.

Optionally, a client data polyhedron can be aligned in the polyhedral data set and the client data polyhedron can be projected into the experience space.

Optionally, a focal point indicator can be applied within the experience space and the focal point of the polyhedral data set can be adjusted to align with the focal point indicator.

Optionally, the polyhedral data set can be unfolded into a flattened data map and the flattened data map can be packetized for transmission over a data network.

Optionally, the packetized flattened data map can be received at a client transceiver device. The flattened data map can be folded into the polyhedral data set. And, the polyhedral data set can be projected into the client space to simulate the experience space.

Optionally, a client data polyhedron can be formed by collecting, via a distributed client sensor array, sheets of client space data of a client space. Each sensor of the distributed client sensor array can comprise a corresponding sheet of client space data. The client data polyhedron can be extracted from the client space data by intersecting ones of the sheets of client space data.

Optionally, reading from the distributed client sensor array or interpolating data of the distributed client sensor array to intersect ones of the sheets of client space data can be performed.

Optionally, unfolding the polyhedral data set into a flattened data map can comprise twisting the collected two-dimensional data into a foldable sequence of triangles.

Optionally, the flattened data map can be transcoded into an RGB format, as by assigning first portions of the data to pixel values of a red spectrum, second portions of the data to pixel values of a green spectrum, and third portions of the data to pixel values of a blue spectrum.

Optionally, a spectrum shift can be applied to the RGB formatted flattened data map to offset one or more pixels values of the red spectrum, the green spectrum, and the blue spectrum.

A system can comprise at least a processor, and a storage medium storing instructions, which when executed by the processor of a machine, causes the system to carry out the methods herein.

A machine-readable medium can carry machine readable instructions, which when executed by a processor of a machine, causes the machine to carry out the methods herein.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

DETAILED DESCRIPTION

Figure 1A:
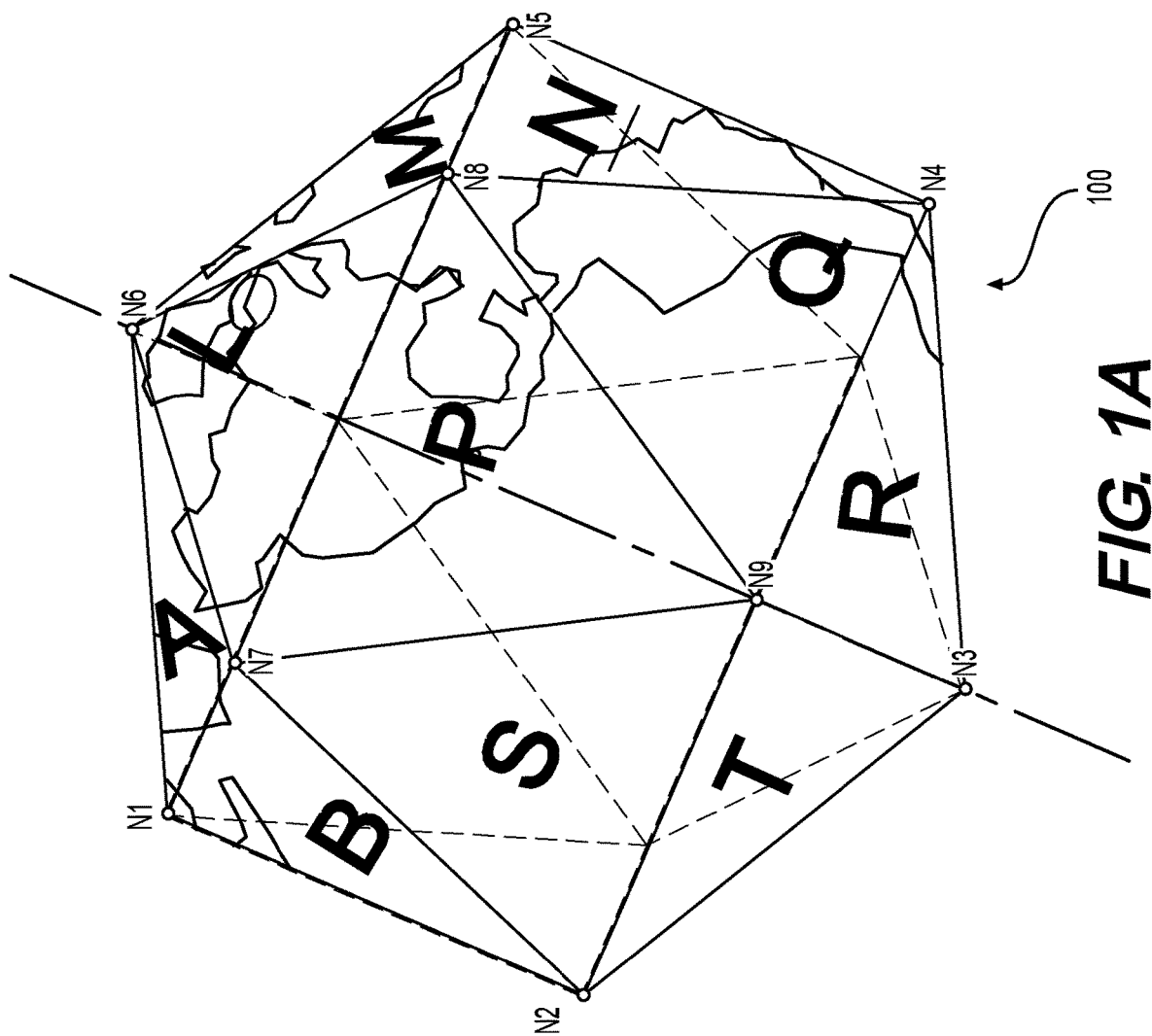
FIG. 1A is a view of the earth as an icosahedron.

Reference will now be made in detail to the examples which are illustrated in the accompanying drawings. Wherever possible, the same reference numbers will be used throughout the drawings to refer to the same or like parts.

This disclosure captures and conveys the cheer of the crowd and the sounds people make in an architectural or other experience space. Experience space data can be some of collected, transferred, extracted, and inserted to enable a remote client to attend an experience space and to enable the remote client to participate in the experience space. The client can also be digitally represented in the experience space by collecting data in the client space. The client space data can be aggregated with the experience space data so that attendees and providers of experiences can also benefit from the addition of the remote client. The remote client also receives experience space data from the vantage point of the portion of the experience space that they have selected, allowing the remote client to "sit" in the experience space. Novel methods and systems can be had for collecting, transferring, extracting, or inserting the experience space data or client space data to facilitate the remote attendance and participation.

Low voltage digital and wireless devices can be assembled and mounted as avatars, or transceiver devices D1, D2, . . . , Dn, in an experience space ES1. Numerous alternatives exist for the transceiver device D1 shown in FIG. 6. A housing can be devised to comprise at least one sensor S1, receiver R1, & transmitter T1.

Transceiver device components can comprise one or more, among others, wired or wireless speaker such as a tweeter, subwoofer, condenser, etc. mounted for voice projection from a remote location, an identification system such as but not limited to a QR code or barcode to link to a mobile app to see and communicate with the remote client, and other optional design features. The transceiver device D1-Dn can comprise equipment such as microphone(s), video camera(s) to stream or stream and record such as mini cameras, camcorders, web cams, action cams, among others, various mounting options designed to fit the host venue such as stand, base, boom, extension arm, tripod, or other accessories, hardware or adapters such as suction cup, clamp, clip, threaded connections, thumb screws, plugs, swivels, grips, among others, an occupancy indicator or motion detector, an identification system, whisper wall, or a windscreen, shield or other protective cover. Additional expedients for streaming or recording footage can comprise DVR, HD (HiDefinition), AVI, MPEG, MJPEG or other programming or connections. Memory devices such as RAM, ROM, EPROM, MicroSD, TF, USB stick, SD card, or other alternatives can be included. Electro-optical hybrid computers having electrical to photonic conversions can be included, as can optical signal processors. Electro-acousto-optical computing can be used. Analog to RF, radio, satellite, among other options can be used. Battery packs can be rechargeable or replaceable, or hard-wiring or plugging to power supplies can be used. Renewable energy can be used to power the transceiver devices D1-Dn. Additional capability can comprise equipment for hotspotting, WiFi, CAT5, SDHC, COAX, 5G, RF, or other connectivity. Upgrades can improve the experience and participation and can comprise such as Team Colors representation or movable parts to mimic the crowd wave effect. Numerous combinations of the options can be had to suit the client and provider environments.

Figure 5A:
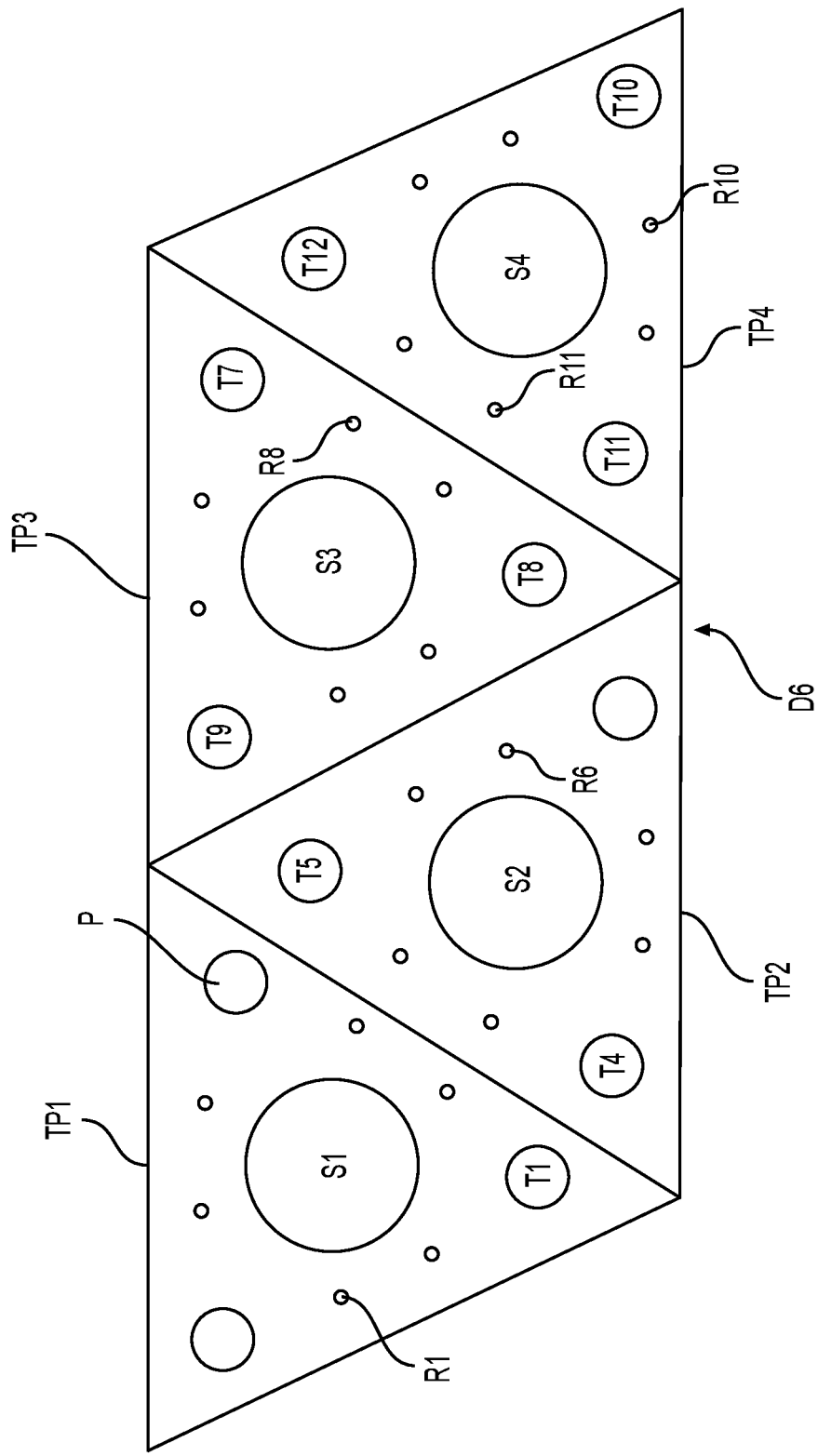
FIGS. 5A & 5B are views of exemplary transceiver devices.
Figure 5B:
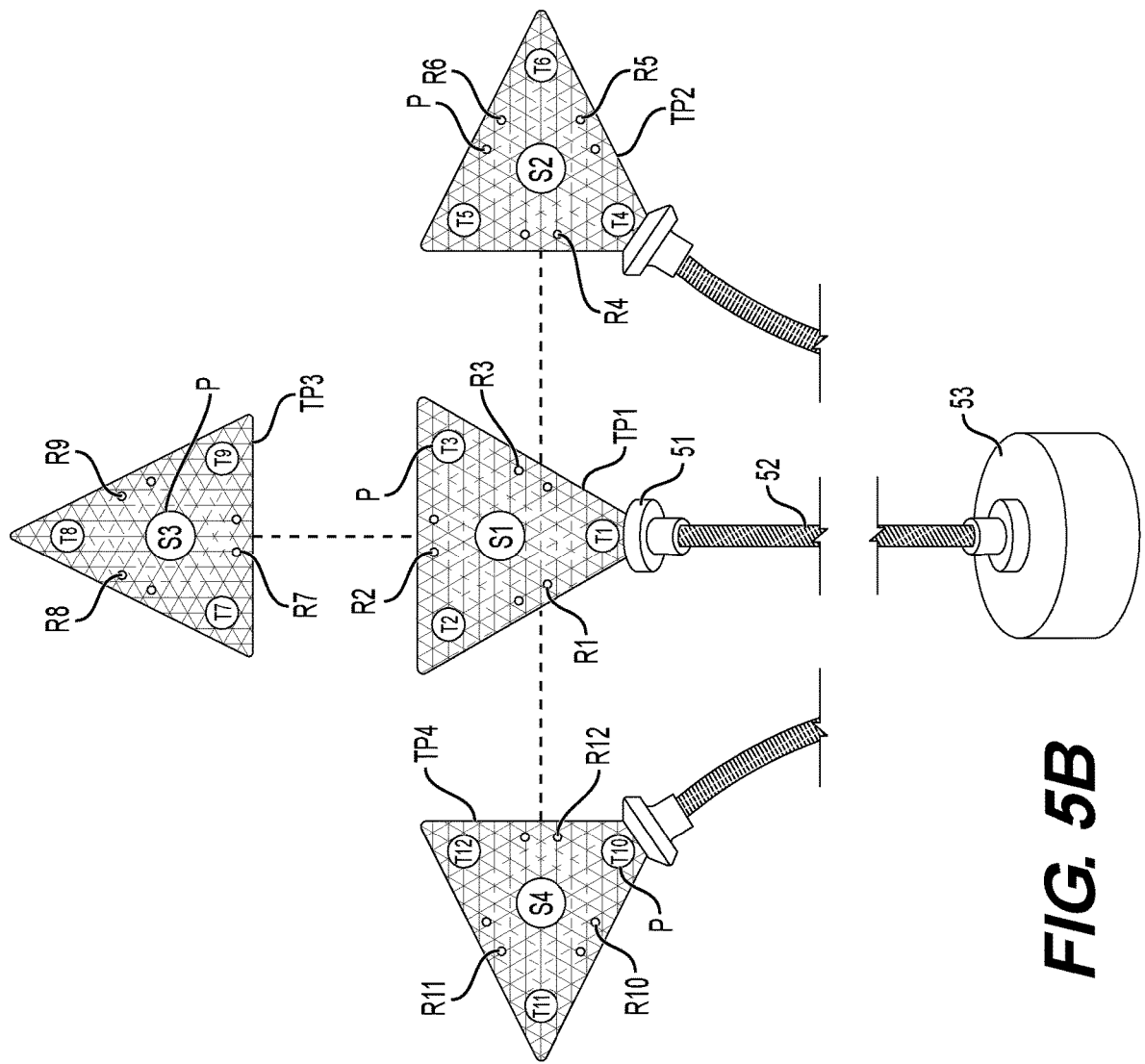

Transceiver device D1-Dn can comprise various mounting options such as a base plate or floor mount, a tripod or pole mount, a seat bracket, a ceiling mount, a wire suspension system, a wall mount, a clip mount, among others. Portions of an exemplary tetrahedral transceiver device D6 are shown in FIGS. 5A & 5B. In FIG. 5A, a substrate is shown with triangular portions TP1-TP4 that can be folded. Other polyhedral forms can be substituted with appropriate adjustments in folds and not limited to icosahedrons, octahedrons, and tetrahedrons.

In FIG. 5B, transceiver device D6 is shown in exploded view with an attachment fixture 51, a cable 52, and a base 53. Fixture 51 can comprise a male or female type attachment to the transceiver device D6. The fixture 51 or the base 53 can be configured to spin to convey a cheering effect. Cable 52 can comprise a power cord, grounding, and a moldable rod or spring to enable positioning of the transceiver device D6 relative to the base 53. Base can comprise a battery or other power connection which can be combined with various ports such as data ports, USB, microSD, USB-C, micro USD, Display Port, HDMI, Ethernet, fiber optic, audio jacks, VGA, among others. Or, in lieu of a base, one of the triangular portions TP1-TP4 can be dedicated to these power connections or other ports. Each triangular portion TP1-TP4 can comprise an assortment of portals P through which signals and can sent or received as by installing combinations of sensors S1-Sn, transmitters T1-Tn, and receivers R1-Rn. The transceiver device D6 can have numerous modifications to accommodate other mounting arrangements.

Receivers R1-Rn can be configured to receive data from cooperating transceiver devices D1-Dn in its experience space ES1 or client space CS1, as appropriate. Receivers R1-Rn can be configured to accept what has been transmitted to them, and so the corresponding transmission technology can be incorporated into the transceiver devices even if not specifically noted below. Receivers R1-Rn can comprise optical, wireless, or wired connectivity to be compatible with communication transmissions. This can comprise, as examples, coaxial, fiber optic, 5G, 4G, WiFi, LiFi (light fidelity), visible light communications (VLC), free space optics (FSO), optical camera communication (OCC), Radio over Fiber (RoF), optical wireless (OWC), other laser communication, matrix-vector multiplier (MVM), micro-ring modulators, spatial light modulators (SLM), free spectral range devices (FSR), demultiplexers to complement outbound multiplexers, line-of-sight (LoS) devices, analog to digital converters, among others. Receivers R1-Rn can be paired, as illustrated, for redundancy and can also be arrayed to interact with an RGB data communication system. Infra-Red (IR) sensors can be included for RGB or other photonic communication with other transceiver devices D1-Dn. As one working example, 3 sets of analog sensors can be configured to convert received optical signals to digital signals, with a corresponding ADC0804 board synchronized with a microcontroller to receive and transcode RBG signals. For example, one or more receivers R8 can be for red RGB signals, one or more receivers R9 can be for blue RGB signals, and one or more receivers R7 can be for green RGB signals. Since the teachings herein are compatible with PCT/US2020/052945, "RGB Network and Devices," filed Sep. 25, 2020, the transceiver device D6 can send and receive RBG data. Sending can be via bits or optical means and can comprise frequency modulation, as examples. For compatibility with other technology, binary signals can be sent and received according to the network attached thereto, including, for example, 5G, WiFi, FiOS, COAX, CAT5, IEEE standardized data, etc.

Transmitters T1-Tn can comprise one or more speaker or one or more projection device. LEDs, LIDAR, multiplexers, among many other devices compatible with the receivers R1-Rn and sensors S1-Sn can be used. When installed in a stadium as an experience space ES1, the speaker can emit at least the remote client's voice. Biometrics can be replicated or imitated, for example an LED emitter can mimic a client's heart racing or an appendage can mimic hand waving. Or, the transceiver can emit vibrations in response to sensed infra-red detections in the experience space, among other alternatives. Additional ambiance can be aggregated or digitally removed or digitally altered so that the remote client's voice appears to other observers to be coming from the location at which the transceiver device D1 is installed in the stadium. Stripping or including background noises from the client's remote location can be achieved using such noise cancelling technology that is well known in the acoustics industry for devices such as headphones and other headsets. Transmitters T1-Tn allow the client to cheer at the event as if present, giving the participants in the event, such as players, attendees, etc. a feeling of a full stadium event. Additional structures can be included with transmitters T1-Tn, such as hologram projectors, display devices, or other devices for transmitting the client into the experience space or for transmitting the experience space ES into the client space CS.

One or more sensors S1-Sn can collect experience space data ESD that can comprise any number of detectable pieces of information. Sounds from the event, lighting, Barometric pressure, temperature, wind pressure, vibrations, smells, biometric data, among many other pieces of sensor-capturable data can be collected. Sensors S1-Sn can comprise numerous types and combinations, such as photo-detectors, transducers, diodes, photonic integrated circuits, These pieces of experience space data ESD can be processed and conveyed to the client's remote location. Appropriate modulation of client devices, which can comprise haptic devices, can replicate the experience space in the client's remote location, as by humidifiers, fans, speaker systems, pneumatics, hydraulics, olfactory simulators, lighting systems, air conditioning systems, etc. Transmitters T1-Tn can modulate the client devices, or in the case of projecting the remote client into the experience space ES1, the transmitters T1-Tn can modulate devices in the experience space ES1. The amplitude of the collected data can be adjusted. For example, the client can select a lower decibel output at their remote location than that collected in the experience space. As another example, the client can lower the intensity of fan pulsations to replicate the feel of the experience space. Oppositely, the client can increase the amplitude of a vibration simulator to have a more intense experience of a ball kick, for example.

The teachings herein are compatible with numerous technologies such that the remote attendance and participation system can represent the remote client's senses such as, but not limited to: their ears and eyes so that they can speak, hear, see, be seen and heard and collectively projected from their remote location into a physical environment. Compatible therewith, the physical environment can be projected into the remote location to replicate at least the sights and sounds of the experience space ES1 into the client space CS1.

As a time frame provider, in addition to the space frame examples above, the time of an event or client interaction can be collected and synchronized with other time frames for remote attendance in another time. This permits re-play of client interactions or events. Imagine proposing to your spouse at an experience space or client space and then projecting that in a new time frame, such as a vow renewal ceremony. Or, a experience space can be scanned at one time to build a rendered virtual experience space, and then at a later time, an all-virtual event can be hosted with remote attendees.

Compatible herewith, PCT/US2020/052945, "RGB Network and Devices," filed Sep. 25, 2020 includes disclosure explaining how clients and providers can participate in data sharing. One goal of that application is to allow a client to connect with providers. The instant application further facilitates that goal by enabling a client to select an event and participate in the event despite being in a location remote from the event. Or, even if at the event, it allows a client to participate in various locations within the event. Users in the remote attendance and participation system can benefit. Providers of events (venue owners, performers, athletes, celebrities, teachers, tour guides, among numerous other hosts of events) can offer tickets to the event via customary means, such as online sales, ticket outlets, or the RGB Network and Devices. A client can acquire access to the event via ticket purchase, access code, account login, site link, among others. By setting up compatible transceiver devices D1, D2, . . . Dn, the client can access the experience space ES1 (stadium, theatre, zoo, lecture hall, observatory, scenic overlook, discotheque, home, among other venues). The client can have conveyed to the remote location experience space data ESD to simulate the event in the remote location. Alternatively or additionally, the client can be projected into the experience space. Using seating charts or the like, clients projected into the experience space can interact with one another, their interactions being private or aggregated into the din of the event. Programming can allow the clients to move about the experience space, effectively moving from seat to seat. This can enable a client to "mingle" at a social event, to change acoustic locations in an opera house, or to follow a play downfield at a sporting event, as examples.

In FIG. 1A, an icosahedron ICO is shown. It can comprise 20 tetrahedrons A-T with a central octahedron comprised of two additional tetrahedrons. 24 triangular faces can be devised using this combination of equilateral triangles and four-sided pyramids. Such a Platonic solid is an accurate way to transform a sphere into an accurate map of a space, such as the earth, a moon, or a venue thereon. The nodal and planar nature of the icosahedron yields useful space frames and time frames. With space and time framed in this way, the triangular faces and connected nodes can be used for facilitating remote attendance and participation. The frames are scalable to accommodate events of different sizes.

Perimeter tetrahedrons A-T can point inwardly towards the central octahedron. FIG. 1C illustrates an exploded view of the icosahedron ICO with all tetrahedron expanded. As Platonic Solids, tetrahedrons, octahedrons, and icosahedrons are well suited for data processing applications of the kind discussed herein. High surface area and low interior volume make for compact and efficient data packetization. Cubes and dodecahedrons can comprise mixtures of shapes and corners that complicate the alignment and processing taught herein. So, the working examples focus on shapes sharing triangular shapes, and the particularly beneficial equilateral triangle shape. Such triangular shapes are well suited to send and receive triangle waves, as opposed to the square wave of most other communication mediums. The triangle waves make for a more authentic and pleasing user experience. The triangle shapes make for efficient capture of the specular and diffuse components of the light and sound to be conveyed among client and experience spaces. Whereas cube shapes and square waves disfavor sound and light propagation, a square wave is useful for clock signals and for triggering synchronous logic of a microcontroller. Should a square wave device be necessary for a disfavored use, it is an alternative to use techniques such a data interpolation and wave function convolution to smooth the square wave to a triangle wave to comport more smoothly with the shapes herein.

An icosahedron ICO can represent the globe, an experience space ES1, or a client space CS1. Nodes N1-N36 can represent touch points of the tetrahedrons A-T. Nodes N1-N36 can indicate locations where transceiver devices D1-Dn can be placed to collect experience space data ESD or client space data CSD. Or, nodes N1-N36 can be digitally solved for or digitally represented by extracting nodes from the experience space data ESD or client space data CSD. It can be possible to scan an experience space ES1, such as a stadium or theatre with LIDAR to make a model of the experience space ES1. The model can be converted into a virtual model for selection of actual and virtual nodes and for selection of the transceiver device placements.

FIG. 1C shows that individual tetrahedrons A-T make up the icosahedron ICO. Each tetrahedron can be extracted from the icosahedron ICO. Shared surfaces and shared nodes N1-N36 can result in duplications in experience space data ESD and client space data CSD that can be subtracted out of aggregated data sets or can be distributed to users of shared experiences.

Figure 1B:
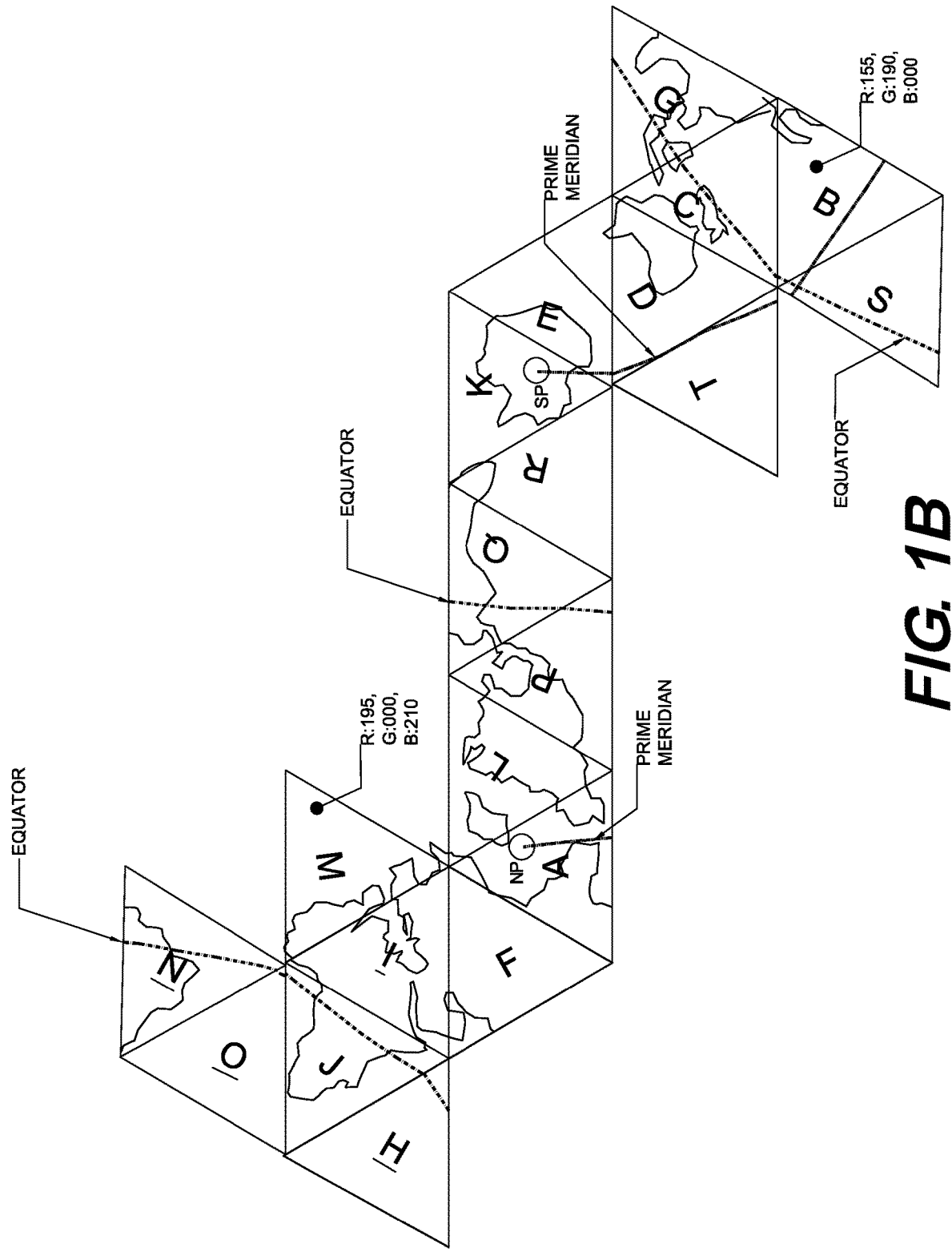
FIG. 1B is a view of one example of a flattened map of the earth of FIG. 1A. Twisting of triangular portions of the 3-dimensional icosahedron of FIG. 1A can be seen in the 2-dimensional flattened map of FIG. 1B.
Figure 1C:
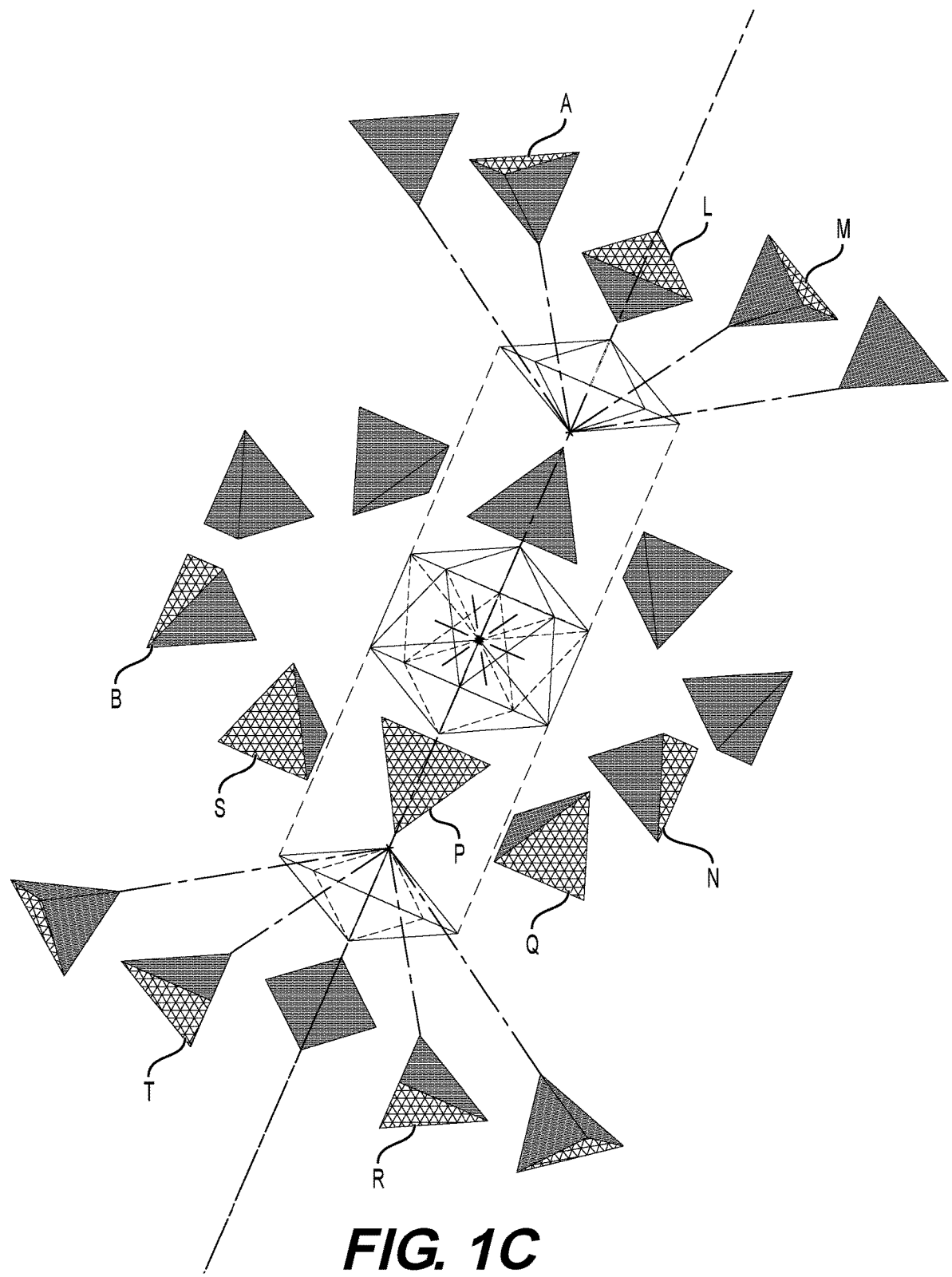
FIG. 1C shows an exploded view of the icosahedron of FIG. 1A.

FIG. 1B illustrates that the icosahedron ICO can be "unfolded" to a 2-dimensional construct. The sheets of experience data or sheets of client data collected for each triangular piece of the icosahedron ICO can be oriented for matrix form communication techniques. Packets of data can be established along with headers, footers, and other aspects of telecommunications transmission, such as IEEE standardized data transmission techniques. Encryption, data keys, among other options can be applied.

Of additional alternative functionality, the sheets of experience data or the sheets of client data can be comprised of data sets that are oriented askew to one or more of the other data sets. So, rather than strictly reading left to right, or top to bottom, it can be possible to have twisted data sets, as best illustrated by the orientation of the lettering in FIG. 1B. While data can be assembled left to right or top to bottom in the 3-dimensional icosahedron ICO, as suggested by the like-orientation of lettering, the "unfolding" of the 3D object into a 2D object can reorient the data. This reorientation can add another aspect of securing the data, as a hacker reading left to right or top to bottom must now also account for twists in the data orientation. Because numerous alternatives exist for "unfolding" or "folding" an icosahedron, the starting point for the left to right orientation can be changed. With appropriate timing algorithms to change the starting point of the 2-dimensional data, security of the data therein can be enhanced.

Compatible with PCT/US2020/052945, "RGB Network and Devices," filed Sep. 25, 2020, the 2-dimensional data sets of FIG. 1B include references to RGB formatting and pixel values. So, the 000 to 255 pixel spectrums can be applied to the data herein. The data sets can be divided so that there is red pixel data, blue pixel data, and green pixel data. The "where," "what," and "when" schema can be appended to the data collected via the icosahedron ICO. Additional color assignments can be had for denoting things like amplitude of light or sound, intensity of vibrations, replies from clients or providers, focal point information, among many alternative pieces of data that can be sensed or conveyed.

Since platonic solids can be structured without being limited by gravity, a virtual structure can be created regardless of an anchor point to the ground. In the virtual world, you are not trying to transcend gravity to build a structure. So, icosahedron ICO can be comprised of other platonic solids with the same triangular shape phase, such as tetrahedrons, or octahedrons. And while cubes are better suited to organizing data itself, the other platonic solids are well suited for creating connections and relationships that are not bound by real-world gravity. While we feel, see, and hear the affects of gravity, the platonic solids herein provides a natural signal decay as the pulse propagates to fill the polyhedral spaces. The pulses emitted by the transceiver devices can be programmed with exponential decay and divergence and can have the adjustable focal points necessary to add realism to the experience. The near-radial structure of the icosahedron is suitable for replicating ideal and real experiences.

Figure 2A:
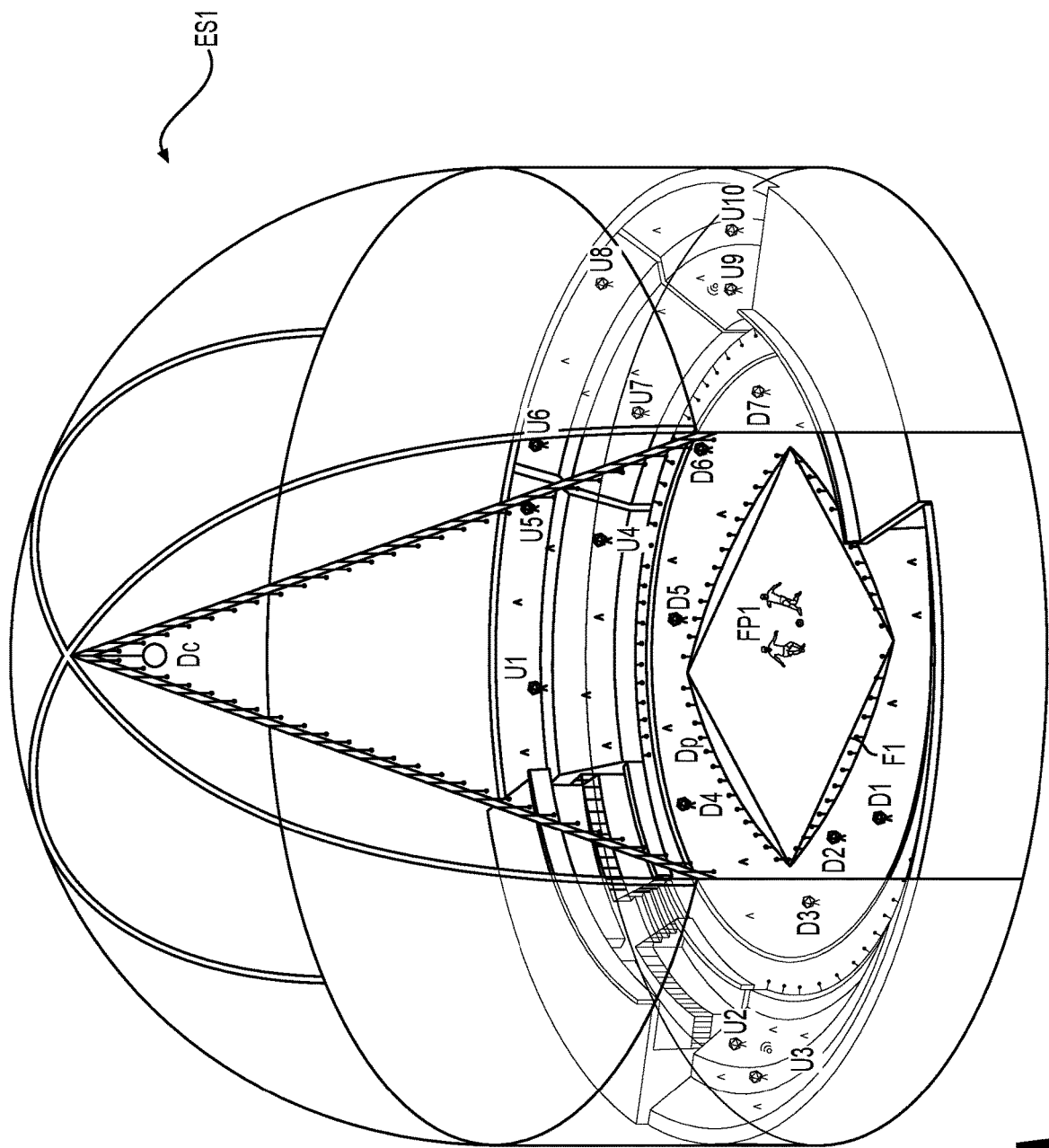
FIG. 2A is a perspective view of an event space.
Figure 2B:
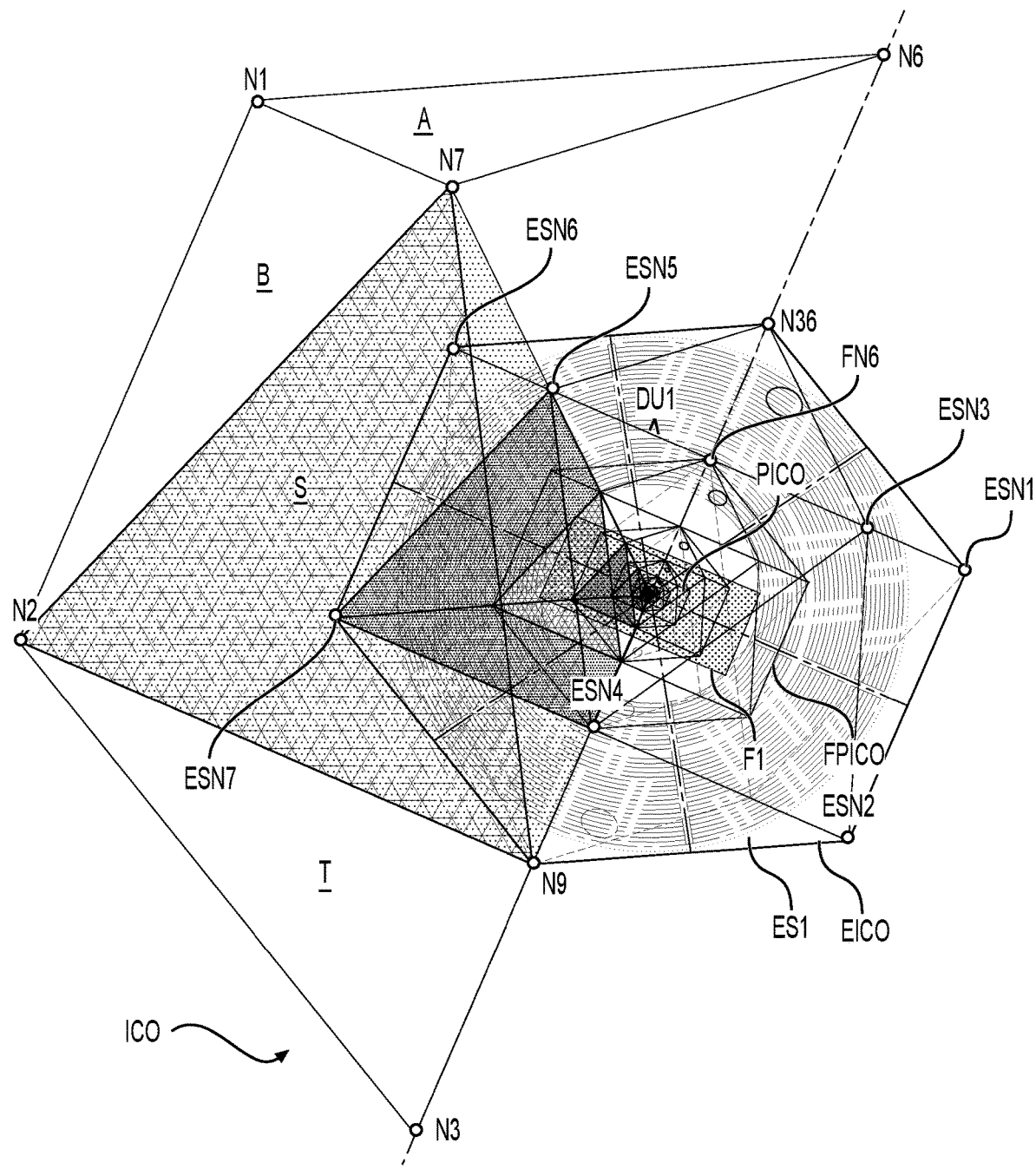
FIG. 2B is a top view of a seating portion of the event space overlayed with telescoping tetrahedrons and icosahedrons.

As one example, a stadium is the experience space ES1 in FIGS. 2A & 2B. Collecting signals of light, sound, etc., the data collected can be used to generate space and time signals tied to the space frame and time frame of the surrounding polyhedrons. The icosahedron ICO is again used, but a truncated frame of tetrahedrons can alternatively be used to represent the experience space ES1. The domed structure can itself be represented by an icosahedron of appropriate scale so as to comprise experience space nodes ESN1-ESNn. Experience space icosahedron EICO, with its ringlets of seating arraignments, can be a subset of icosahedron ICO. Icosahedron ICO can be a world-view, with the stadium having its location relative to the global icosahedron ICO. So, stadium, experience space icosahedron EICO, can share one or more node (N9 and N36 in this example) with the global icosahedron ICO. Numerous experience space nodes can be designated to delineate features such as tier seating, box seating, standing rooms, sidelines, locker room alleys, among other features. In this example, the playing field F1 and a player on the playing field F1 are desired focal points.

So, a focal point icosahedron FPICO can surround the playing field F1 and a player icosahedron PICO can surround a player. As denoted by the shaded tetrahedrons, sheets of data can be collected or interpolated to zoom into and around the experience space ES1. The collected signals can be used to render a virtual experience space as part of the real experience space ES1 so that remote users can benefit from the cultural advantages of an agora by filling the polyhedral client locations generated in the virtual experience space and projecting those filled spaces into the experience space ES1.

Transceiver devices D1-Dn can be referred to as provider devices and can be distributed in the experience space ES1. Distribution can comprise, for example, the transceiver devices D1-Dn being hung from ceiling or suspension structures (also denoted ceiling device DC), or seat-mounted (denoted as carats, including client-selected transceiver device DU1), or pole mounted (denoted pole device Dp), or wall mounted to form experience space nodes ESN1-ESNn. The experience space ES1, represented as an icosahedron, can have numerous tetrahedral subunits with numerous corresponding nodes Nn. The corresponding nodes Nn can be digital or actual physical nodes formed by transceiver devices D1-Dn. That is, a transceiver device D1-Dn can be set on a pole near the playing field F1, or on any other seat or structure, or even in the ground of the stadium, to serve as a node for an icosahedron. In the instance that a transceiver device is not or cannot be mounted, a node can be interpolated from surrounding collected data.

A client can acquire a seat from the provider. Now, a client can attend the event remotely. FIG. 2A shows a number of users U1-U10 arrayed in the stadium. As denoted by the icosahedrons at transceiver devices D1-D7, the users U1-U10 can transfer to other locations within the stadium, or to other locations denoted by a carat.

One or more player or other interesting feature can wear a haptic device, such as an RFID tag or other transmitter. The player can be a selectable or designated focal point FP1. Clients & providers can select the focal point FP1 to be the vanishing point from which their sheets of data are extracted.

Figure 3:
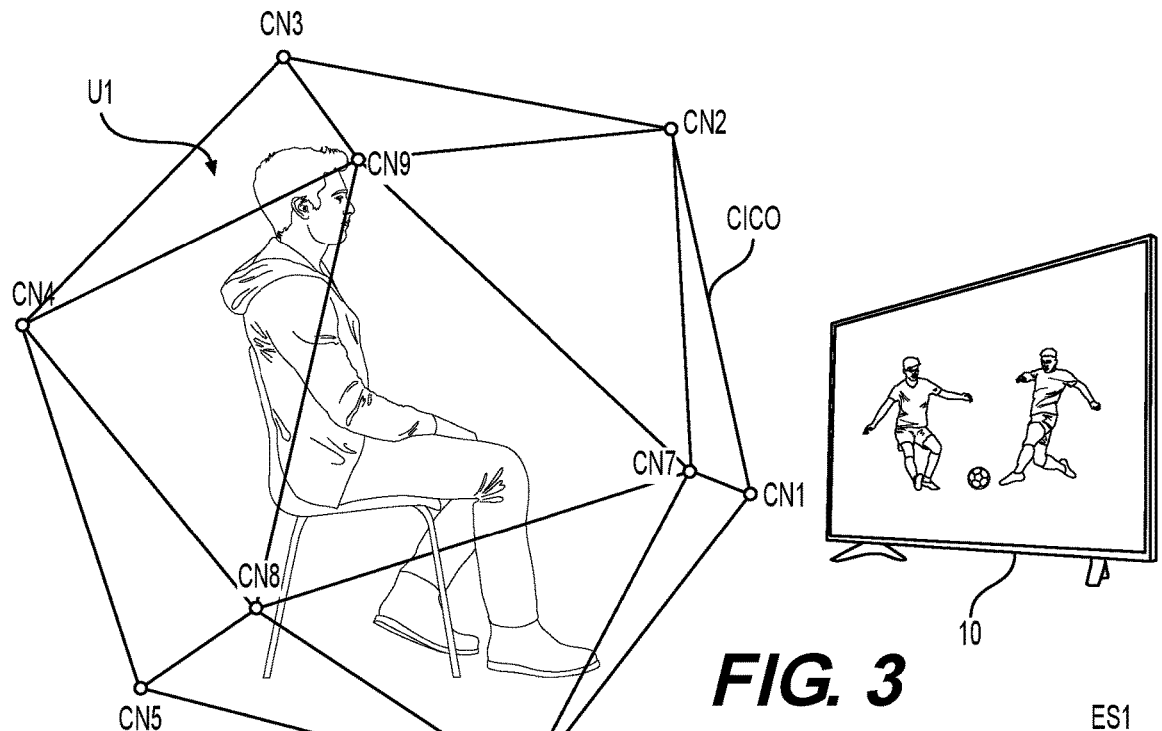
FIG. 3 is a view of a client as a remote user viewing a portion of the experience space.

A client U1 is shown in FIG. 3 within a client icosahedron CICO. Client nodes CN1-CN9 are illustrated, though there are 36 nodes available as touch points of the client icosahedron CICO. Client U1 arranges to remotely attend the event at experience space ES1 by connecting to the transceiver device (client-selected transceiver device DU1 in FIG. 2B). Numerous sales avenues exist to connect to the client-selected transceiver device DU1, such as internet ticket sales or calendaring through the techniques taught in PCT/US2020/052945, "RGB Network and Devices," filed Sep. 25, 2020.

Transceiver devices, in form of client transceiver devices (also indicated as client nodes CN1-CN5) are installed in the client space CS1. Walls, ceilings, outlets, wall jacks, furniture, or other structures in the client space can be used to mount the client transceiver devices CN1-CN5. With only 5 devices in this example, some of the nodes of the client icosahedron CICO must be interpolated from the collected data. At least one client transceiver device CN1-CN5 connects to a display device 10, illustrated as a television. Phone, laptop, tablet, projector, hologram system, virtual reality system, and other expedients exist as substitutions. The focal point FP1 is displayed. Speakers of the display device 10, if available, can be modulated to convey the sound that would occur in the location of client-selected transceiver device DU1. Or, client transceiver devices CN1-CN5 can be modulated to convey the sound that would occur in the location of client-selected transceiver device DU1.

The client transceiver devices CN1-CN5 use their corresponding sensors S1-Sn to collect data from the client space CS1, such as gesticulations, utterances, etc. The client transceiver devices CN1-CN5 can communicate between each other to convey the collected data. For example, only one of the transceivers can connect to the internet while the other transceivers do not, thereby allowing grades of transceiver devices at different price points. Data collected by the sensors S1-Sn is forwarded through the cloud, in this example, the RGB network, to result in the client U1 being projected into the experience space ES1.

Figure 4A:
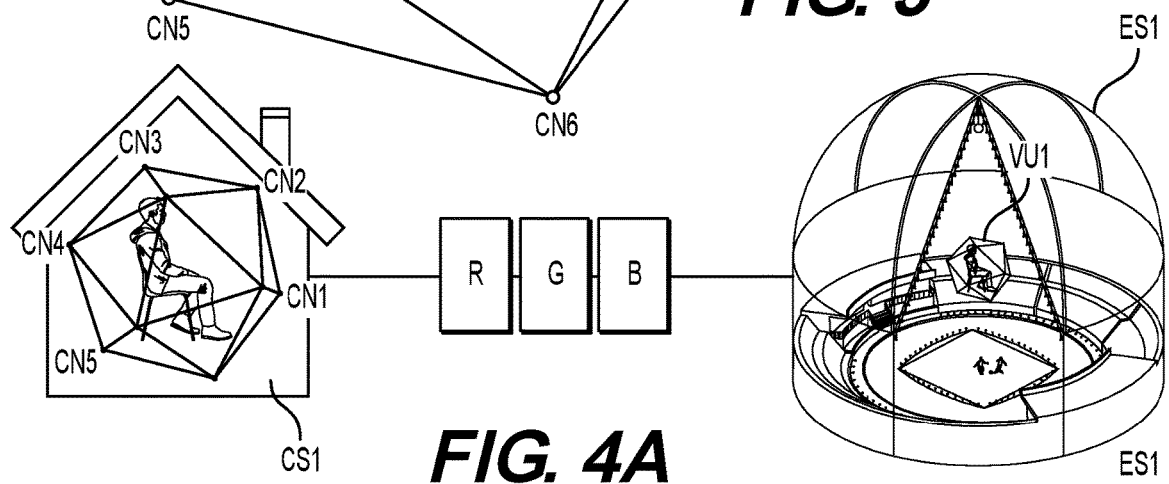
FIGS. 4A & 4B are alternative representations of client spaces being projected into an experience space.
Figure 4B:
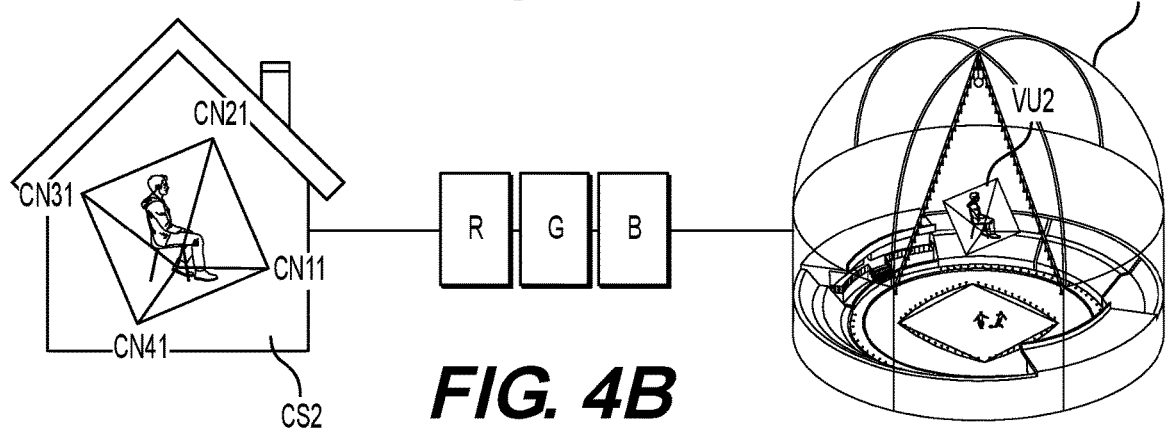

In FIG. 4B, fewer client transceiver devices CN11, CN21, CN31, CN41 are used in the client space CS2. A lower data package can be associated with the lower number of client transceiver devices or an aspect of scalability can be applied. In any case, an octahedron comprised of two tetrahedrons is formed in the client space CS2, with two nodes of the octahedron being interpolated from the data collected by the other client transceiver devices CN11, CN21, CN31, CN41. Such substitution of platonic solids can be done because the triangular shape phase is consistent and stackable within the global icosahedron ICO. This can be seen in FIG. 2B, where the tetrahedron, having a triangular shape phase, projects as a piece of the other icosahedrons. Indeed, the client space could comprise a tetrahedron of data in lieu of the octahedron or icosahedron. FIG. 4B shows that the client can be projected into experience space ES1 in the octahedral form.

Figure 6A:
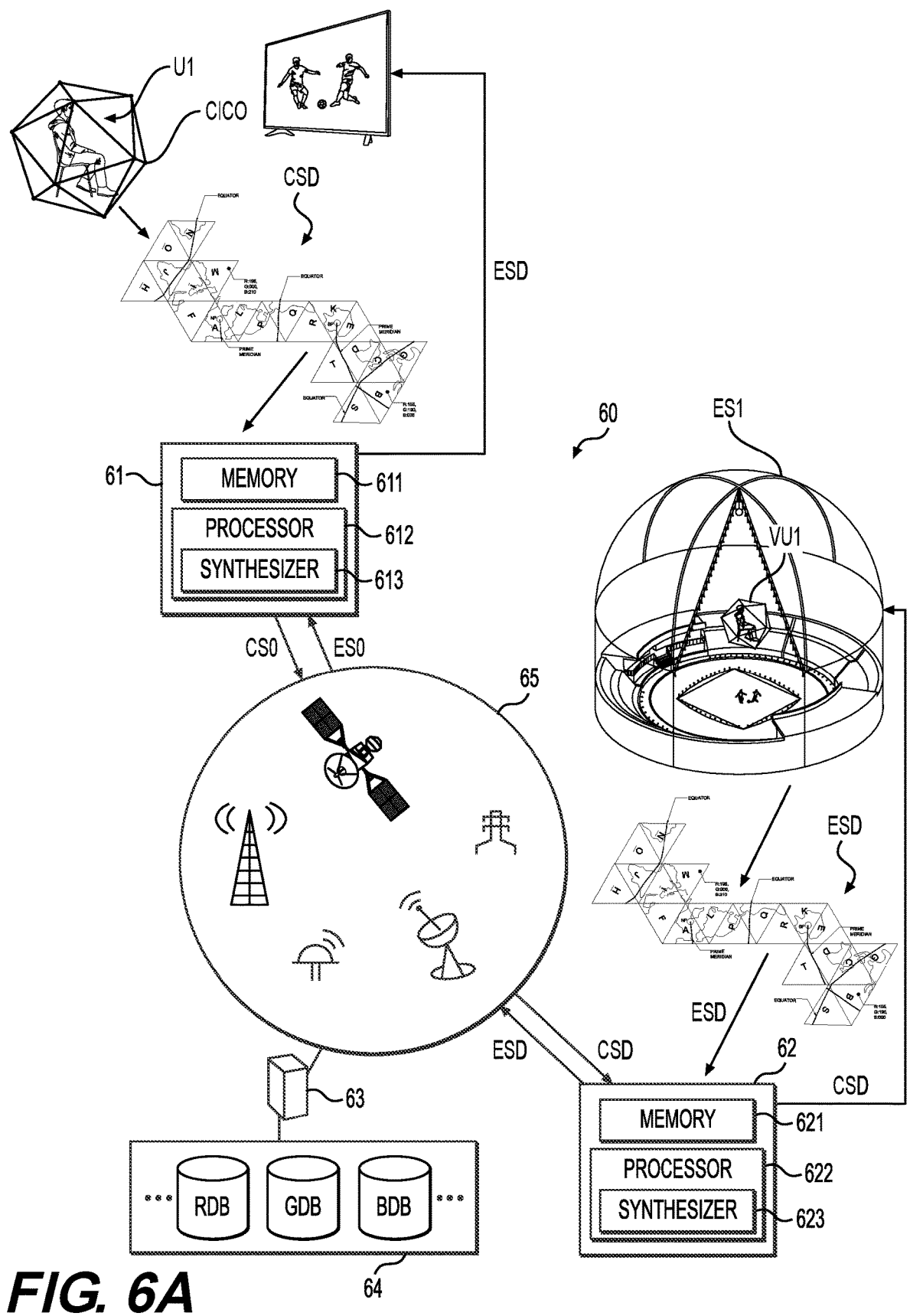
FIG. 6A is a view of an exemplary network connecting the client space and experience space.
Figure 6B:
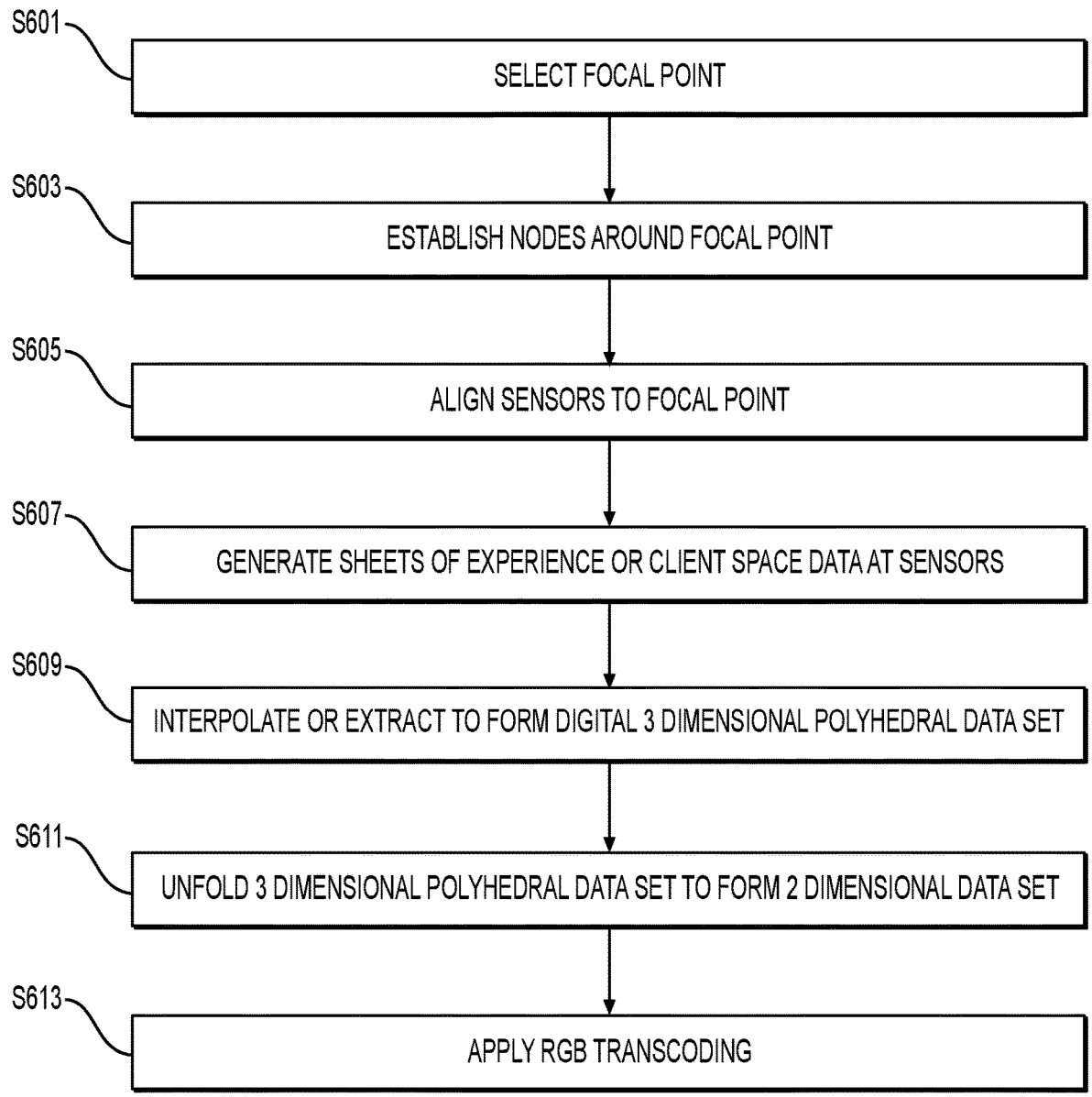
FIGS. 6B and 6C are flow diagrams of methods consistent with the teaching herein.
Figure 6C:
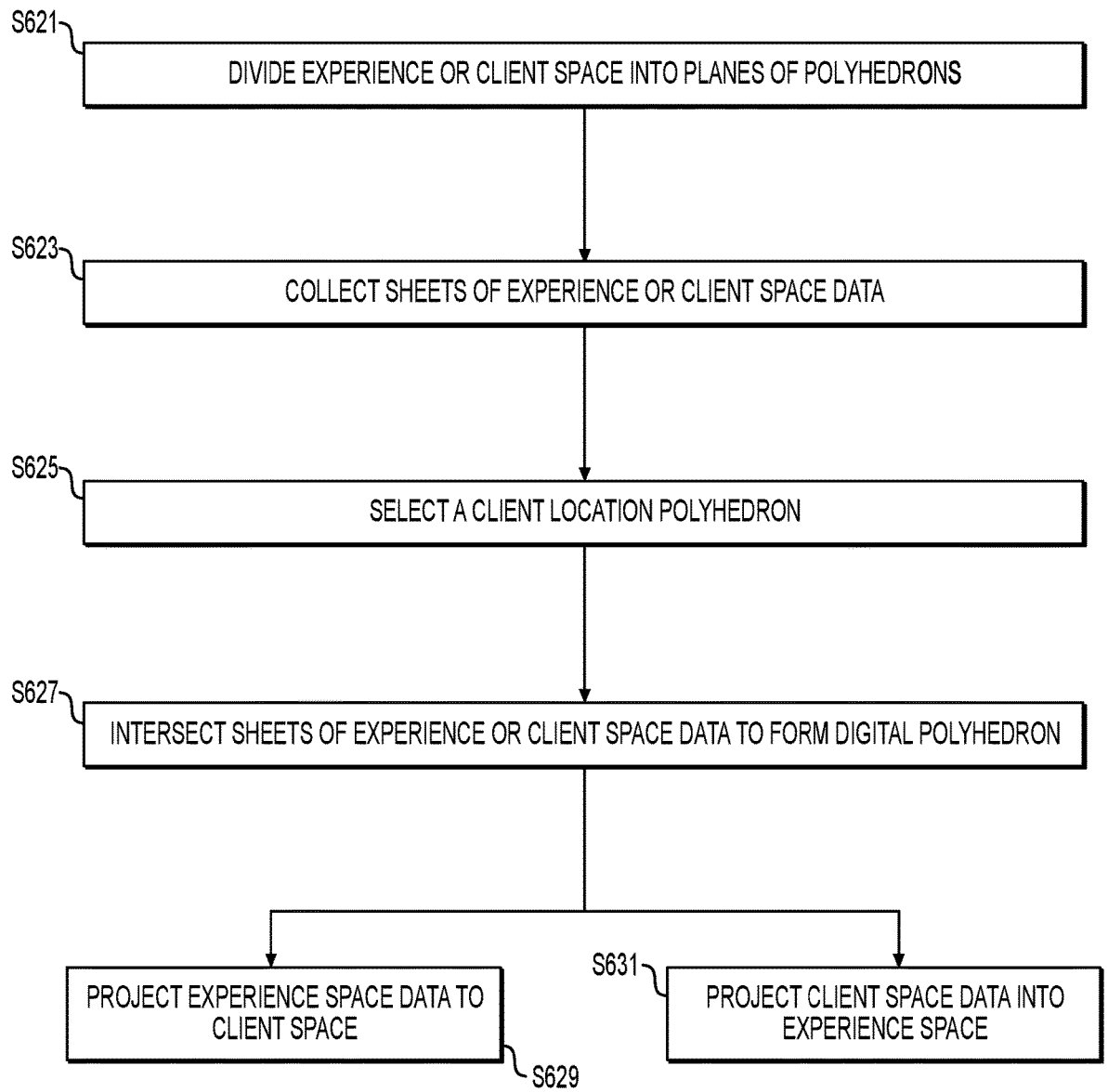

A method of transferring data facilitates the digitizing of data for remote attendance and participation. FIGS. 6B and 6C delineate complementary steps for achieving remote attendance and participation. Portions of FIGS. 6B can be interspersed in FIG. 6C.

Step S621 comprises dividing an experience space or client space into planes of polyhedrons. This can be as done in FIG. 2B. Polyhedrons comprising a network of interconnected planes is shown in FIG. 2B. A tetrahedron S shares a node with the experience space node ESN7, from which a smaller tetrahedron can be derived and telescoped down to node shared with the playing field icosahedron FPICO. As a place comprising desirable focal points, the playing field F1 also comprises a tetrahedron for such additional features as players and their equipment. A ball or player on the playing field F1 can comprise a haptic or other transmitter that becomes a focal point of attention in the experience space. The tetrahedrons can be pointed towards that focal point so that the focal point becomes a vanishing point for the sheets of data collected for each polyhedron. A tetrahedron sharing a node with the focal point easily becomes an epicenter of light and sound propagating out to fill the sheets of data. So too, the icosahedron centered on the focal point becomes an epicenter of data propagation for collection by the transceiver devices. The symmetrical form of the icosahedron ICO permits the use of a central emanation point for wave information (light, sound, vibration) and a framework for synthesizing data about the wave information. Nodes that align in a plane can be used to collect data emanating from the focal point. Triangulation can be used to build a sheet of data between the nodes, as an alternative to other interpolations discussed herein.

In step S623, transceiver devices (DU1, D1-Dn, Dc, Dp etc.) collect, via a distributed sensor array, sheets of experience space data ESD of the experience space E1. As most sensors are planar, each sensor of the distributed sensor array can comprise a corresponding sheet of experience space data ESD. Because each transceiver device (DU1, D1-Dn, Dc, Dp etc.) can comprise numerous sensors S1-Sn, it is possible to stagger the depth of the sensors or array the sensors to pick up data from various perspectives, such as stereoscopically. The sensors S1-Sn can be arrayed via one or more transceiver devices (DU1, D1-Dn, Dc, Dp etc.) to collect data from multiple vantage points so that one or both of the sensors S1-Sn or the transceiver devices (DU1, D1-Dn, Dc, Dp etc.) form at least one actual node N1-N36, ESN1-ESN36, etc. Then, the sheets of data represent the experience space or client space from more than one vantage point.

In step S625, it is possible to select one of the polyhedrons as a client location polyhedron. As FIG. 2B illustrates, numerous polyhedrons can be generated in an experience space ES1. Things like data packages, data rates, bandwidth, transceiver device resolution, among others, can influence the size and number of nodes of the client location polyhedron. Being virtual, the client location polyhedron is not bound by gravity. It can be selected in a seating or standing area, in an unobstructed viewing or listening area, or any other space that can be designated in the experience space ES1. Clusters of such virtual seats can be aggregated so that remote clients can mingle when projected into the experience space ES1.

In step S627, client location data corresponding to the client location polyhedron can be extracted from the experience space ES1 data by intersecting ones of the sheets of experience space data ESD to form a polyhedral data set. In FIG. 2B, this would entail having a node, desirably in the form of a client-selected transceiver device DU1 (designated with a carat) in a location where the client would like to view the event. Similar as was done for the players and ball on the playing field F1, an array of polyhedrons can be telescoped to the client-selected transceiver device DU1 to denote a final client location polyhedron. A digital polyhedron can be formed by intersecting sheets of experience space data. Sensors S1-Sn and transceiver devices D1-Dn, Dp, Dc, etc. forming nodes are collecting data in multiple directions, as the example of FIG. 5B illustrates. One example of a transceiver device D6 is itself a tetrahedron arrayed to collect additional tetrahedrons by collecting sheets of data that can be intersected.

As an example, the experience space node ESN5 can collect a triangular sheet of data that intersects the plane formed by experience space nodes ESN4, ESN7, & ESN8. Icosahedron node N9 can in turn collect one or more additional triangular sheets of data formed by experience space nodes ESN4, ESN5, & ESN7, or ESN5, ESN7, & ESN8, or ESN4, ESN7, & ESN8. The triangular sheets of data can be connected at experience space node ESN7, which can collect an additional triangular sheet in the plane formed by experience space nodes ESN4, ESN5, & ESN8. The three triangular sheets can be intersected to form the polyhedral data set for a digital polyhedron. Interpolation can be used to extract data in between known other pieces of data. For example, a sensor S1-Sn could comprise a limited number of collection points yet a larger resolution can be mathematically solved by interpolation. Desired data points can be solved between known other data points.

With FIG. 2B as a working example, the principles can be applied to the numerous available nodes of the experience space ES1 and also to the client spaces CS1, CS2. A client U1 is shown in a client icosahedron CICO in FIG. 3 remotely watching the event on a display device 10. As FIGS. 4A & 4B contrast, the clients U1, U2 can participate in their client space CS1, CS2 with one or more transceiver device collecting data about the client U1, U2. Different bandwidths, data rates, resolutions, pixilation, among other features can be customized between the client spaces CS1, CS2. Filtering can be applied to remove background noises or aspects of the remote location that the client U1, U2 does not wish to share. For example, the client U1, U2 can turn off the ability to project their physical appearance, or can allow projection of appearance but not sound, or the client U1, U2 can opt not to project into the experience space ES1 at all. Hence, steps S629 & S631 are alternatives. The client U1, U2 can project client space data CSD1, CSD2 in the form of virtual client polyhedron VU1, VU2 into the experience space ES1 as in step S631. Then, their cheering and other responses to the event can be part of the experience space ES1. The virtual client polyhedron VU1, VU2 can project within the parameters of the client location polyhedron. The client U1, U2 can be projected in the client location polyhedron with the transmitters T1-Tn of the client-selected transceiver device DU1. Transmitting the client space data CSD in this polyhedral way give a richer experience to the surrounding event participants. The transmitters T1-Tn are reaching to fill the client location polyhedron in the dimensional way that users actually interact with a space. This is a departure from single-point emitters that replicate sound in a single direction. Instead of a sound experience like holding your phone up to your ear, the event participants have the client space data CSD emitted towards multiple planes. The volume of the polyhedron is filled with transmissions of light, sound, and other transmissible vibrations or harmonics, and the surface of the polyhedron can be dense with actual and interpolated data points so that the client is more broadly cast into the experience space ES1.

And, step S629 indicates that experience space data ESD is projected into the client space CS1, CS2. The client U1, U2 can likewise experience the richness of the event with the efforts of the one or more client transceiver devices CN1-CN36 reaching out to surround the client U1, U2 with multiple sheets of experience space data ESD. The client U1, U2 can have multiple client transceiver devices at some of the several nodes CN1-CN36, CN11, CN21, CN31, CN41 so that wavelets of light or sound can be projected into the planes of the client polyhedron. Likewise, the other transceiver devices installed in the experience space ES1 can project to replicate the sheets of virtual client polyhedron VU1, VU2. So, players and spectators could experience the client inputs from multiple vantage points of the distributed transceiver devices.

The polyhedrons can comprise a combination of icosahedrons and tetrahedrons. This permits the replication of triangular shapes. Planes are easily constructed by the three points (nodes) at the tips of the triangular shapes. Much like the sheet material of FIG. 5A, foldable to construct a tetrahedral transceiver device D6, the larger icosahedral form can be formed like a two-dimensional sheet. These foldings lends well to matrix data distributions customary in the IEEE 802 regime.

Sensors of the distributed sensor array can comprise sheets of material for collecting two-dimensional data. Slabs or strata or substrates or boards or the like can be used to embed or mount sensors in an actual or connected plane. A connected plane can be formed via triangulation techniques among transceiver devices or components of an individual transceiver. As above, semiconductor substrates, diodes, temperature sensor, acoustic sensors, opto-couplers, among numerous alternatives exist. As one example, strips of diodes can be mounted on a substrate in a grid pattern to collect a two-dimensional matrix of optical inputs. Or, adjacent transceiver devices can pool their acoustical collections to interpolate a plane of acoustical data. The two-dimensional data collected can be manipulated to extract a three-dimensional polyhedron forming the polyhedral data set. An interpolation algorithm or other rendering algorithm can be applied, among other techniques for projecting a collected data point out from its collection point.

As one technique, as when a contiguous sensing sheet is not available, or when an area is not covered by a sensor per se resulting in an interruption of collected space by uncollected space, extracting three-dimensional polyhedrons can comprise assigning one or both of actual nodes and virtual nodes to form the vertices of the three-dimensional polyhedron. Say client U2 only installs client transceiver devices at client nodes CN21, CN11, & CN41, it can be possible to assign these nodes as actual nodes. Yet, the remaining nodes CN31, etc. are virtual nodes. Data collected at client nodes CN21, CN11, & CN41 is used to approximate, interpolate, or render what data should be collected by nodes CN31, etc. This can be done by reading from the two-dimensional data or interpolating from the two-dimensional data to construct the client data polyhedron. So, experience space or client space polyhedral data sets can be constructed from the actual nodes or the virtual nodes.

The nodes and use of triangular shapes are useful for aligning a client data polyhedron in the polyhedral data set. As FIG. 2B and 1C make clear, the tetrahedrons, octahedrons and icosahedrons are connected at touch points (the nodes) and have intersections and shared lines. Enumerable nodes can be interspersed with non-enumerable nodes to merge the two infinities of Cartesian space and the continuum. Numerous remote attendees can be fitted in the experience space. And, the nodes can be used to split a world-view icosahedron (FIG. 1A) into experience spaces ES1, client spaces CS1, CS2, and client location polyhedrons. One or more time frame can be included with the space frames. One Platonic solid can be designated as a spaceframe into which other polyhedron can be projected. By the illustrated selection of triangle-based Platonic Solids, stacking and aligning the polyhedrons becomes a simple task. Shared nodes, like the icosahedral node N9 overlapping with a node of the experience space icosahedron EICO lends well to scalability, data re-use, redundancy, and the ability to confirm data correctness. Having parallel lines and complementing angles, the client data polyhedron can be projected into the experience space in any number of selectable locations.

As an alternative to constructing a static polyhedron around an experience space ES1, it is possible to apply principles from FIG. 6B. A focal point like a ball, player, performer, etc. can be selected in step S601. Selection can be digital, as by picking a point in the collected data, or selection can be actual, as by application of a haptic or other transmitter. Selection can result in applying a virtual or physical focal point indicator within the actual or virtual experience space ES1. Step S603 can comprise, if not already done, the establishment of nodes around the focal point. In step S605, the sensors S1-Sn can be aligned to the focal point to collect data in the direction of the focal point. The transceiver devices D1-Dn, Dc, Dp can pan or zoom to the selected focal point. As FIG. 1C illustrates, the tetrahedron A-T making up an icosahedron ICO can be configured to point to the middle of the icosahedron ICO, which can be the focal point. If the transceiver devices D1-Dn, Dp, Dc don't physically move (swivel, track, pan, etc.), then the zoom can be digitally processed in the collected sensor data. This will adjust, physically or virtually, the focal point of the polyhedral data set to align with the focal point indicator. Sheets of experience or client space data can be generated S607 at the sensors or from the data collected by the sensors in step S607, with subsequent interpolation or extraction to form digital 3-dimensional polyhedral data sets in step S609.

While the sheets of data from the sensor arrays are useful for rendering, interpolating or otherwise extracting the three-dimensional polyhedral, it is convenient to use matrix form communication standards that are readily available in the market. So, to further adoption efforts of the polyhedral remote attendance techniques, it is beneficial, as in step S611, to unfold the 3-dimensional polyhedral data set into a 2-dimensional flattened data map like that shown in FIG. 1B. Other arrangements of the triangular surfaces of tetrahedrons A-T can be found in the literature, so the exact layout of FIG. 1B is an example and alternatives are encouraged, indeed alternatives improve the security of the data transmission, as discussed elsewhere herein. Before or after packetizing the flattened data map for transmission over a data network, it is possible to apply the RGB transcoding of step S613. Such transcoding assigns pixel values to the data of the flattened data map, and these pixel values can be shifted for further safety and security. Indeed, the client space data CSD can be assigned complementing pixel values in the red, blue and green spectrum to pixel values assigned to the experience space data ESD. When alignment of the virtual client polyhedron VU1, VU2 is achieved with the client location polyhedron in the experience space ES1, a collimation of the pixel values can indicate a match in the formation of the virtual client polyhedron VU1, VU2. Or, chiral mapping can be applied, with the client space data forming one mirrored hand chiral to the hand of the client location polyhedron. Then, flattened data maps can be folded as left-hand or right-hand. Algorithmic matching of handed data sets can be achieved, with the tenets of FIG. 1B applying to enhance security.

So, much like mapping the client space data to the experience space, a client transceiver device can receive the packetized flattened data map. This is shown in FIG. 6A. The client devices, as either an app installed on a phone or tablet, or software installed on a computer, or firmware in the transceiver devices, can fold the flattened data map into the polyhedral data set. The polyhedral data set can be projected into client space to simulate the experience space.

As explained above more generally, it is possible to form a client data polyhedron by collecting, via a distributed client sensor array, sheets of client space data of a client space. Each sensor of the distributed client sensor array can comprise a corresponding sheet of client space data. The client data polyhedron can be extracted from the client space data by intersecting ones of the sheets of client space data. Also, it is possible to read from the distributed client sensor array or to interpolate data of the distributed client sensor array to intersect ones of the sheets of client space data. The client space data can be flattened and transcoded much like the experience space data can.

Methods herein can comprise unfolding the polyhedral data set into a flattened data map comprising twisting the collected two-dimensional data into a foldable sequence of triangles. This FIG. 1B concept is outlined above and adds security to the data in the matrix packets. So, too, security is added by transcoding the flattened data map into an RGB format, as by assigning first portions of the data to pixel values of a red spectrum, second portions of the data to pixel values of a green spectrum, and third portions of the data to pixel values of a blue spectrum. Another security measure can comprise a spectrum shift to the RGB formatted flattened data map to offset one or more pixels values of the red spectrum, the green spectrum, and the blue spectrum.

As outlined in FIG. 6A, a system can comprise one or more processor, and one or more storage medium storing instructions, which when executed by the processor of a machine, causes the system to carry out the methods herein. So, too, a machine-readable medium can carry machine readable instructions, which when executed by a processor of a machine, causes the machine to carry out the method herein. While the request, access, & scheduling, are discussed below, consistent with teachings in PCT/US2002/052945, other data can be substituted in the RGB color scheme, such as sound, light, time, among other collected pieces of data.

In FIG. 6A, the provider device 62 is configured to communicate with the database array 64 via the network 60. The provider device 62 is configured to communicate the red provider request data pixel, the red provider access data pixel, and the red provider scheduling data pixel to a red data database RDB of the database array 64 at a first network spectrum. These provider communiques can correspond to aspects of the experience space ES1.

The provider device 62 can be configured with a variety of bidirectional communication tools. A communication cloud is shown generally at 65. Icons for various communication network spectrums are shown, including satellite, wireless such as 4G or 5G, laser, radar, and traditional wireline. As a security measure for both provider device communications and client device communications, each of the rows of data for transmission across the network can be done by the client device 61 and provider device 62 at different network spectrums (fiber optic, telephone, wireless, WIFI, etc.). As an alternative, only one of the red, green, or blue rows are transmitted at a different network spectrum while the other two rows use the same network spectrum.

To continue the example, the green provider request data pixel, the green provider access data pixel, and the green provider scheduling data pixel are transmitted to a green data database GDB of the database array 64 at a second network spectrum. And, the blue provider request data pixel, the blue provider access data pixel, and the blue provider scheduling data pixel are transmitted to a blue data database BDB of the database array 64 at a third network spectrum. The network 60 can be configured so that the first network spectrum differs from the second network spectrum and from the third network spectrum, and the second network spectrum differs from the third network spectrum.

Likewise, the database array can be configured to bidirectionally communicate with the client device 61 via the communication cloud 65 of the network 60. The client device 61 can communicate the RGB formatted client inputs to the red data database at a fourth network spectrum, to the green data database at a fifth network spectrum, and to the blue data database at a sixth network spectrum. The client network spectrums can differ from the provider network spectrums.

In order match between client space data and experience space data, database array can be searched. Provider data rows of experience space data can be stored and searched in the memory device 621 of provider device 62 or can be stored and searched in provider data rows in the database array 64 of the network 60. Memory device 621 can store experience space data ESD and client space data CSD for processing. The database arrays are further configured to bidirectionally communicate with the client device 61 via the communication cloud 65 of network 60. The client device can be configured to communicate client inputs comprising at least client request data RGB formatted to comprise the red client request data pixel, the green client request data pixel, and the blue client request data pixel; client access data RGB formatted to comprise a red client access data pixel, a green client request data pixel, and a blue client request data pixel; and client scheduling data RGB formatted to comprise red client scheduling data pixel, a green client scheduling data pixel, and a blue client scheduling data pixel.

The client device 61 can be configured to receive, store & process network inputs in its computing device. The network inputs can be the provider inputs as forwarded through the communication cloud 65 whether directly from the provider 62 or whether from the database array 64. Client device 61 can store algorithms and client space data CSD and forwarded experience space data ESD in memory 611. The processor 612 comprising synthesizer 613 can receive network inputs comprising at least provider request data, provider access data, and provider scheduling data. The client device 61 at synthesizer 613 processes the network inputs in the client processor. The synthesizer 613 can synthesize the rows of client data columns with the rows of provider data columns comprising collimating the RGB formatted network inputs with the RGB formatted client inputs to result in a row of collimated pixel values. It is possible to discard the row of collimated pixel values such as when the client transceiver cannot emanate an aspect of the experience space or vice versa, or when the row of collimated pixel values comprises one or more pixel value outside of a predetermined range of pixel values, or when the row of collimated pixel values comprises one or more non-white pixel values. The processor, via the client algorithm, can display an indicia of a match on the client display device when the row of collimated pixel values collimates within the predetermined range or when the row of collimated pixel values collimates to all white pixel values. Additional alternatives for transcoding, synthesizing and storing can be substituted.

Many aspects of the experience space data ESD can be processed in the provider device 62. The network 60 can comprise the provider device 62 configured to bidirectionally communicate with the network 60. The provider device 62 can digitally receive, store, and process experience space data ESD and other provider inputs in a provider computing device comprising at least a provider processor 622 and a provider memory device 621. The provider inputs can comprise at least provider request data, provider access data, and provider scheduling data that can be complementary to client inputs. A synthesizer 623 can perform similarly as the synthesizer 613 for the experience space data ESD and provider inputs. Synthesizer 613 can stitch together the client space data CSD with the experience space data ESD to align the client space data CSD in the client location polyhedron for ultimately projecting the virtual client polyhedron VU1, VU2. The client synthesizer 613 can stitch the experience space data ESD to conform to the capabilities of the client transceivers at client nodes CN1-CN36, CN11, CN21, CN31, CN41 as by discarding incompatible data or queuing compatibly data for modulation on the client transceiver.

The provider device 62 can process the provider inputs in the provider processor 622 with a stored provider algorithm stored in the provider memory device 621. The provider algorithm can be configured to transcode digital provider inputs received from a touchscreen, keyboard, or other provider input device into provider RGB formatted data. Such transcoding can be done directly on the provider device 62 so that the provider inputs have the RGB-related security features applied to the client inputs. Alternatively, it is possible to forward the digital provider inputs to the server 63 for RGB formatting and distribution in the database array 64. Numerous alternatives exist for the network 60.

As a working example of a machine-readable medium and a system, it is possible to use a mobile application on a device, such as a television, computer, tablet, phone, laptop, smart TV or the like. A diorama of projected or constructed screens can be used. The remote client operates controls via the app connecting the remote client device provided with the system or a collection of existing devices allowed and licensed to connect with the system.

Transceiver devices can have an identifier, including but not limited to a QR code or an embedded device, or broadcast device, or signal or packet address. The identifier allows different remote clients CS1, CS2, using the mobile application, the option to see and communicate with each other over the network 60 at their remote locations. The identifier links to the mobile app and interacts with multiple systems such as the experience space ES1 internal cameras to feature remote clients on the jumbo screen or a television broadcaster to randomly televise remote clients in the crowd. Furthermore, anyone physically attending the event can interact with the remote client U1, U2 via the identifier on their own personal computer device or by simply striking up a conversation.

The interaction between remote clients, host clients and the general public provides for substantially more than the human behavior of the crowd because it is a crowd formed beyond the physical barriers of the environment and architectural space. Furthermore, the remote attendance and participation system extends space and time available to a client since anyone can partially attend multiple events at the same time.

Remote clients using the remote attendance and participation system may or may not know each other. In this instance chance is thrown into the mix. Chance, something intentionally eliminated from networks and invitation only meetings is now a part of the Remote Attendance and Participation System. Therefore, wherever the system is installed people may meet by chance in the ambiance of a setting of common interest. It may be on top of the Empire State Building, or remote viewing the Mona Lisa at the Louvre. It may be on a trip to Mars to cheer the brave astronauts attempting the long journey. Perhaps, it is during intermission of an opera or in the jungle of the Amazon. Any destination, performance, setting, studio, or home may have the Remote Attendance and Participation System to offer live experiences around the world and beyond.

This system connects people and device(s) with software providing a new way to attend and participate in any live presentation, performance or event. The Remote Attendance and Participation System also offers a new way to travel, observe and meet people from around the world and beyond.

The combined hardware and software system allows a person anywhere in the world with WIFI internet, 5G connectivity, or other internet service to easily and independently virtually occupy or lease the remote attendance and participation system. The transceiver devices D1-Dn, Dc, Dp can be set up and ordered by the host of the experience space ES1. The host provides the space and the remote client controls the transceiver devices to produce the unique experience for the remote client to turn around and look up or down to see, hear, speak, cheer or applaud at the event [What], in a particular location [Where], during a specific time frame [When].

The remote client can control the transceiver devices via remote control to rotate 360 degrees in the x,y plane or 180 degrees in the y,z plane. It is advantageous if a video camera is installed with a zoom function. A speaker as a transmitter T1-Tn can project the client's voice cheering, clapping and other sounds into the physical space of the experience space ES1. Even if the entire crowd consists of participating remote attendees, they can be heard by the presenters, performers or athletes. Sensors S1-Sn can comprise microphones to capture the ambient sounds in the experience space to be projected into the remote client space CS1 to give client U1, U2 the feeling of being a part of the crowd. Instead of depending upon another person or cameraman filming, the remote client using the mobile app controls the sights and sounds of the event from their point of view. The client can control: the angle of the view via a video camera 3a; the speaker's audibility and clarity; and audibility of the client's voice and environment; the microphones' pickup of ambient sound from the device or sound from a fixed position; and the transceiver device at which the client is positioned in the experience space (carats in FIG. 2A).

The experience space, such as but not limited to a theater or stadium, can be built for sound amplification, sound dampening, or uniform distribution of sound. Venues are built or naturally occur with resonance or dissonance, reflection or absorption. These architectural realities are difficult to account for algorithmically. It is costly to order a site assessment to verify and design on an as needed basis to decide what areas of an experience space ES1 are well-suited for each type of sound or light modulation that can occur. Rather than algorithmically account for design choices in an event space or natural formations in natural settings, the transceiver devices D1-Dn, Dc, Dp, DU1, D6 collect experience space data from the vantage point of a participant and in a volume that the participant would occupy. The polyhedral "container" can be filled with experience space data ESD collected at the virtual client polyhedron and can be filled with client space data CSD projected into the experience space ES1. Now, the venue is more authentically filled, and the user has a more authentic experience.

A host client may be any owner of private property, tenant of private property, tenant of public property or custodian of public or private property. The host may install the system, upon approval of the owner, for remote clients to lease the remote attendance and participation system devices by the minute or the hour to enjoy the view, ambiance, or to meet someone at the host's venue. When not "leased" to individuals the system may be used to monitor the venue for security purposes. Connection as an additional security system or connection to their existing security system is optional. Physical attendees may interact with the remote attendees for participation upon invitation as determined by the host.

A host client such as but not limited to a museum or gallery may install the device(s) from the ceiling to view and discuss items in the collection. Conversations may occur via the mobile app via messaging or online through the app if the venue is a quiet location. Vistas, ranches, zoo, and other sightseeing locations, tourism locations, transit lines, exercise classes, ballet or theatre venues can benefit from the teachings herein. Venues that are hard or impossible for clients to reach, like the flagpole on a golf course or a space station, can benefit.

Other implementations will be apparent to those skilled in the art from consideration of the specification and practice of the examples disclosed herein.

What is claimed is:

1. A method of transferring a polyhedral data set, comprising:
    dividing an experience space into polyhedrons comprising a network of interconnected planes;
    collecting, via a distributed sensor array, sheets of experience space data of the experience space, each sensor of the distributed sensor array directed from a vantage point to a focal point to collect a corresponding sheet of experience space data;
    selecting one of the polyhedrons as a client location polyhedron with a client-selected vantage point and a client-selected focal point;
    extracting, from the experience space data, sheets of client location data corresponding to the client location polyhedron by intersecting ones of the sheets of experience space data to form a polyhedral data set that surrounds the client location polyhedron;
    transferring the polyhedral data set to a client space; and
    projecting the transferred polyhedral data set to simulate the client location polyhedron in the client space.

2. The method of claim 1, wherein the polyhedrons comprise a combination of icosahedrons, octahedrons, and tetrahedrons.

3. A system comprising a processor, and a tangible storage medium storing instructions, which when executed by the processor of a machine, causes the system to carry out the method of claim 1.

4. A non-transitory machine-readable medium carrying machine readable instructions, which when executed by a processor of a machine, causes the machine to carry out the method of claim 1.

5. The method of claim 1, wherein the polyhedrons comprise one or more icosahedron comprising inwardly-pointing tetrahedrons, and wherein the inwardly-pointing tetrahedrons establish the corresponding sheets of experience space data on the facing planes of the inwardly-pointing tetrahedrons with the inward-points as experience space focal points.

6. The method of claim 1, comprising transcoding the polyhedral data set into an RGB format by assigning first portions of the polyhedral data set to pixel values of a red spectrum, assigning second portions of the polyhedral data set to pixel values of a green spectrum, and assigning third portions of the polyhedral data set to pixel values of a blue spectrum.

7. The method of claim 1, wherein sensors of the distributed sensor array comprise sheets of material for collecting two-dimensional data, and wherein the method comprises extracting, from the two-dimensional data, a three-dimensional polyhedron forming the polyhedral data set.

8. The method of claim 7, wherein extracting a three-dimensional polyhedron comprises: assigning one or both of actual nodes and virtual nodes to form the vertices of the three-dimensional polyhedron; and reading from the two-dimensional data or interpolating from the two-dimensional data, the actual nodes or the virtual nodes.

9. The method of claim 7, comprising:
    extracting a client data polyhedron in the client space; and
    projecting the client data polyhedron into the experience space.

10. The method of claim 1, comprising: unfolding the polyhedral data set into a flattened data map; and packetizing the flattened data map for transmission over a data network.

11. The method of claim 10, comprising: receiving the packetized flattened data map at a client transceiver device; folding the flattened data map into the polyhedral data set; and then projecting the polyhedral data set into the client space to simulate the experience space.

12. The method of claim 10, wherein unfolding the polyhedral data set into a flattened data map comprises twisting the collected two-dimensional data into a foldable sequence of triangles.

13. The method of claim 10, comprising transcoding the flattened data map into an RGB format by assigning first portions of the flattened data map to pixel values of a red spectrum, assigning second portions of the flattened data map to pixel values of a green spectrum, and assigning third portions of the flattened data map to pixel values of a blue spectrum.

14. The method of claim 13, comprising applying a spectrum shift to the RGB formatted flattened data map to offset one or more pixels values of the red spectrum, the green spectrum, and the blue spectrum.

15. The method of claim 1, comprising:
    collecting, via a distributed client sensor array, sheets of client space data of the client space, each sensor of the distributed client sensor array directed from a client vantage point to a client focal point to collect a corresponding sheet of client space data;
    extracting a client data polyhedron from the sheets of client space data by intersecting ones of the sheets of client space data;
    aligning the client data polyhedron in the polyhedral data set; and
    transferring the client data polyhedron to one or more experience space transceiver to simulate the sheets of client space data in the experience space, the one or more experience space transceiver comprising the distributed sensor array.

16. The method of claim 15, comprising reading from the distributed client sensor array or interpolating data of the distributed client sensor array to intersect ones of the sheets of client space data.

17. The method of claim 15, wherein transferring the client data polyhedron comprises transmitting the client data polyhedron to project into the experience space via an experience space distributed transmitter array.

18. The method of claim 1, wherein the projecting comprises modulating one or more device to simulate a diorama of the experience space in the client space.

19. The method of claim 18, wherein the projecting comprises modulating a distributed transmitter array to simulate the diorama of the experience space on projected or constructed screens.

20. The method of claim 1, comprising:
    applying a plurality of focal point indicators within the experience space;
    selecting to shift from one to another of the plurality of focal point indicators; and
    adjusting the client-selected focal point of the polyhedral data set to realign with the selected shift from one to another of the plurality of focal point indicators.

21. The method of claim 20, comprising designating the focal point indicators as epicenters towards which the polyhedrons point and from which the sheets of experience space data are collected.

* * * * *